(12) United States Patent
Hsiao et al.

(10) Patent No.: US 12,724,577 B2
(45) Date of Patent: Sep. 1, 2026

(54) ELECTRONIC DEVICE

(71) Applicant: CARUX TECHNOLOGY PTE. LTD., Singapore (SG)

(72) Inventors: Yuan-San Hsiao, Miaoli County (TW); Li-Wei Sung, Miaoli County (TW)

(73) Assignee: CARUX TECHNOLOGY PTE. LTD., Singapore (SG)

( * ) Notice: Subject to any disclaimer, the term of this patent is extended or adjusted under 35 U.S.C. 154(b) by 0 days.

(21) Appl. No.: 18/665,557

(22) Filed: May 15, 2024

(65) Prior Publication Data

US 2024/0296001 A1 Sep. 5, 2024

Related U.S. Application Data

(63) Continuation of application No. 17/529,169, filed on Nov. 17, 2021, now abandoned.

(30) Foreign Application Priority Data

Dec. 25, 2020 (CN) ......................... 202011562481.7

(51) Int. Cl.

| | |
|---|---|
| ***G06F 3/14*** | (2006.01) |
| ***B60K 35/10*** | (2024.01) |
| ***B60K 35/22*** | (2024.01) |
| ***B60K 35/28*** | (2024.01) |
| ***B60K 35/81*** | (2024.01) |
| ***G06F 3/04845*** | (2022.01) |
| ***G06F 3/04886*** | (2022.01) |

(52) U.S. Cl.

CPC ................ *G06F 3/14* (2013.01); *B60K 35/10* (2024.01); *B60K 35/22* (2024.01); *B60K 35/28* (2024.01); *B60K 35/81* (2024.01); *G06F 3/04845* (2013.01); *G06F 3/04886* (2013.01); *B60K 2360/1438* (2024.01); *G06F 2203/04803* (2013.01)

(58) Field of Classification Search

None

See application file for complete search history.

(56) References Cited

U.S. PATENT DOCUMENTS

| | | | | |
|---|---|---|---|---|
| 9,081,477 | B2 * | 7/2015 | Kang | G06F 3/04815 |
| 2009/0315867 | A1 * | 12/2009 | Sakamoto | G06F 3/0488 345/184 |
| 2012/0062743 | A1 * | 3/2012 | Lynam | B60R 1/12 348/148 |
| 2016/0062626 | A1 * | 3/2016 | Kubota | B60K 35/29 715/716 |
| 2017/0078112 | A1 * | 3/2017 | Troemel, Jr. | B60K 35/00 |
| 2021/0081344 | A1 * | 3/2021 | Chang | G06F 13/385 |
| 2021/0245662 | A1 * | 8/2021 | Blank | B60R 11/0235 |

FOREIGN PATENT DOCUMENTS

| | | |
|---|---|---|
| CN | 110073666 | 7/2019 |
| KR | 20160148958 | 12/2016 |

* cited by examiner

*Primary Examiner* — Matthew Yeung

(74) *Attorney, Agent, or Firm* — JCIPRNET

(57) ABSTRACT

The disclosure provides an electronic device including a display and a processor circuit. The display device may include a first display region and a second display region. The processor circuit may include a first port and a second port. The processor circuit receives a data signal through the first port and generates a first image signal for display in the first display region. The processor circuit receives a second image signal through the second port and displays the second image signal in the second display region.

14 Claims, 3 Drawing Sheets

ELECTRONIC DEVICE

CROSS-REFERENCE TO RELATED APPLICATION

This application is a continuation application of and claims the priority benefit of U.S. patent application Ser. No. 17/529,169, filed on Nov. 17, 2021, which claims the priority benefit of Chinese application serial no. 202011562481.7, filed on Dec. 25, 2020. The entirety of the above-mentioned patent application is hereby incorporated by reference herein and made a part of this specification.

BACKGROUND

Technical Field

The disclosure relates to an electronic device used in a cockpit system.

Description of Related Art

The current trend of automotive panels is towards large size and high resolution. Cluster display and central information display (CID) can be combined to form a cockpit system. As a result, the image bandwidth between the head unit and the display system will reach more than 10 gigabytes per second (Gbps). In other words, the complexity of the entire cockpit system will become relatively higher.

SUMMARY

The disclosure is directed to an electronic device capable of reducing image bandwidth between a head unit and a display system.

According to embodiments of the disclosure, an electronic device may include a display device and a processor circuit. The display device may include a first display region and a second display region. The processor circuit may include a first port and a second port. The first port and the second port are located in the same processor circuit. The first port receives the data signal. The processor circuit generates the first image signal according to the data signal, and outputs the first image signal to drive the display device to display the first image signal in the first display region. The second port receives the second image signal. The processor circuit drives the display device to display the second image signal in the second display region.

In the electronic device according to the embodiments of the disclosure, the second port receives the second image signal through automotive Ethernet. In the electronic device according to the embodiments of the disclosure, the second image signal is a compressed image signal.

In the electronic device according to the embodiments of the disclosure, an image signal compression specification of the second image signal is video coding H.264.

In the electronic device according to the embodiments of the disclosure, an image signal compression specification of the second image signal is video coding H.265.

In the electronic device according to the embodiments of the disclosure, the first port receives the data signal through an automotive bus. In the electronic device according to the embodiments of the disclosure, the second image signal is not provided by the SERializer/DESerializer.

In the electronic device according to the embodiments of the disclosure, the second display region may include a touch region, and the processor circuit executes a touch operation of the touch region according to a touch instruction. In the electronic device according to the embodiments of the disclosure, images displayed in the second display region may include a first image and a second image. The processor circuit executes the touch operation of the touch region according to the touch instruction to adjust display positions of the first image and the second image in the second display region.

In the electronic device according to the embodiments of the disclosure, a portion of the data signal is displayed in the first display region.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
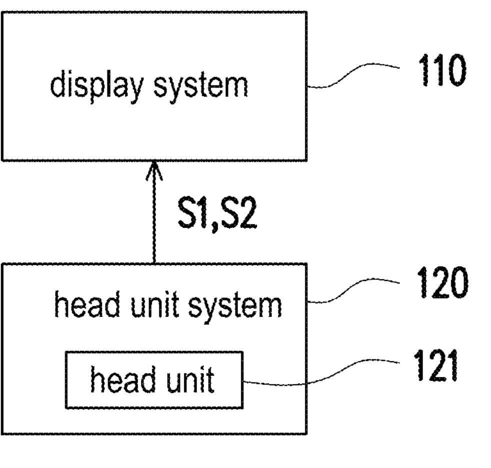
FIG. 1 shows a schematic diagram of a cockpit system according to some embodiments of the disclosure.

The disclosure can be understood by reference to the following detailed description and also in conjunction with the accompanying drawings. It should be noted that, for the reader's ease of understanding and for the sake of brevity of the accompanying drawings, only a portion of the electronic device is illustrated in several of the accompanying drawings in this disclosure, and specific components in the accompanying drawings are not drawn to actual scale. In addition, the number and dimensions of the components in the drawings are for illustrative purposes only and are not intended to limit the scope of the disclosure.

In the following description and the claims, terms such as "include" and "comprise" are open-ended, and therefore should be interpreted as "include but not limited to".

It should be understood that while the terms first, second, third . . . may be used to describe a variety of constituent components, the constituent components are not limited to this terminology. This term is used only to distinguish a single component from other components in the specification. Instead of using the same terminology in the claims, the terms first, second, third . . . are substituted in the order in which the components are declared in the claims. Therefore, in the following description, the first constituent component may be the second constituent component in the claims.

In some embodiments of the disclosure, terms such as "joint", "interconnection", etc., unless specifically defined, may refer to two structures in direct contact, or may refer to two structures that are not in direct contact and in which other structures are provided between the two structures. The terms about connecting and joint may also include the case where both structures are movable, or where both structures are fixed. In addition, the term "coupling" may include any direct and indirect means of electrical connection.

Reference will now be made in detail to exemplary embodiments of the disclosure, examples of which are illustrated in the accompanying drawings. Wherever possible, the same reference numerals are used in the drawings and the description to refer to the same or like parts.

Figure 2:
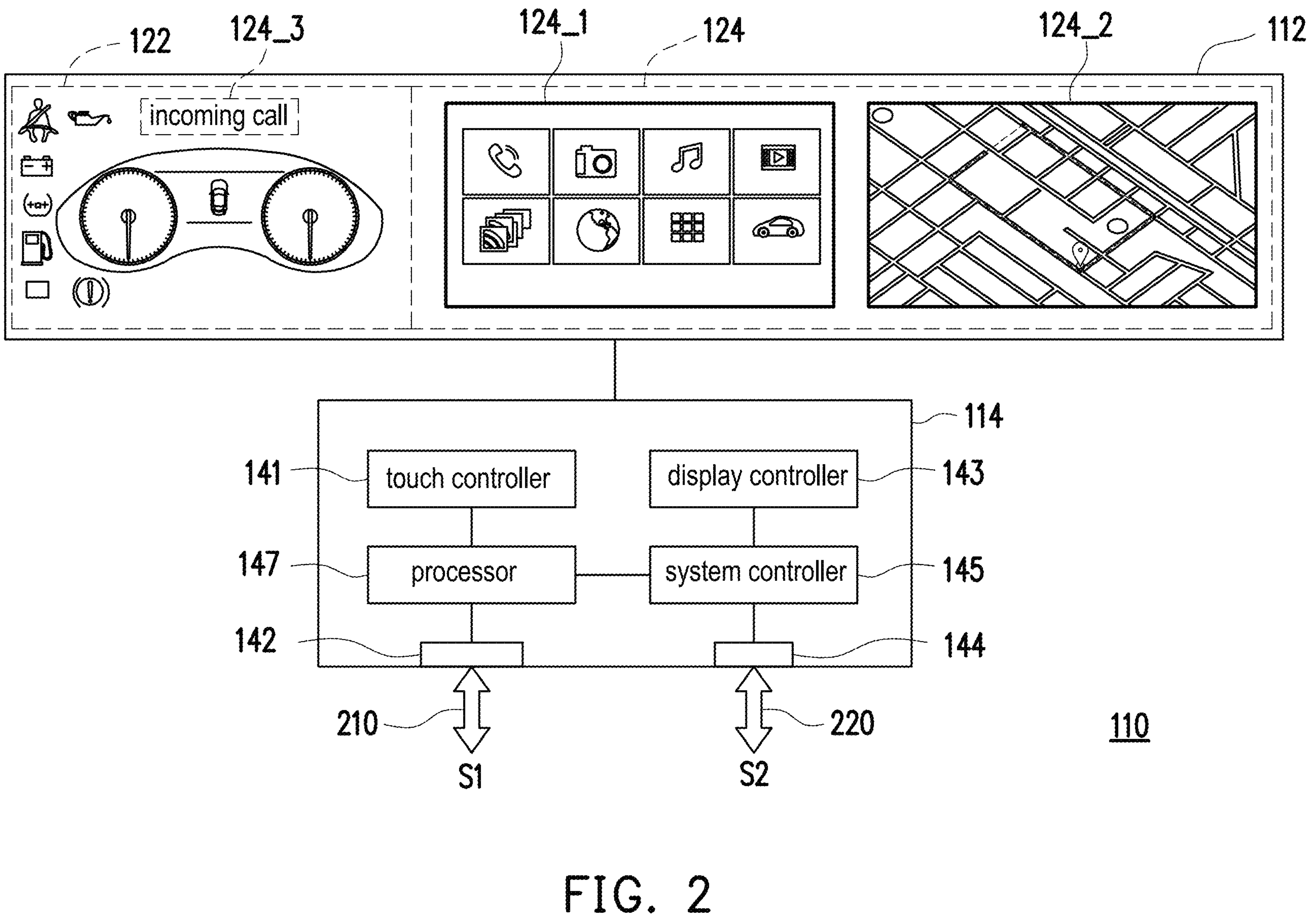
FIG. 2 shows a schematic diagram of a display system according to the embodiments of FIG. 1.

FIG. 1 shows a schematic diagram of a cockpit system according to some embodiments of the disclosure. FIG. 2 shows a schematic diagram of a display system according to the embodiments of FIG. 1. Referring to FIG. 1 and FIG. 2, a cockpit system 100 may include a display system 110 and a head unit system 120. The display system 110 is an example of an electronic device. The head unit system 120 may include a head unit 121. The display system 110 may receive a data signal S1 and an image signal S2 from devices including the head unit 121 and an electronic control unit (ECU) to display dashboard information and image information in different display regions, respectively, but the disclosure is not limited to receiving signals from the head unit and the electronic control unit.

Specifically, in FIG. 2, the display system 110 may include a display device 112 and a processor circuit 114. The display device 112 may include a first display region 122 and a second display region 124. The first display region 122 is, for example, a cluster display for displaying images of dashboard information. The second display region 124 is, for example, a central information display for displaying images of central information. According to this embodiment, the first display region 122 and the second display region 124 are two different display regions on one display panel. The second display region 124 may have a touch function. Users may adjust positions of displayed images in the second display region 124 through a touch gesture. For example, the images displayed in the second display region 124 include a first image 124_1 and a second image 124_2. Users may adjust display positions of the first image 124_1 and the second image 124_2 in the second display region 124 through the touch gesture or a touch instruction. According to some embodiments, the first display region 122 may have a touch function, or both the first display region 122 and the second display region 124 have the touch function, which may be designed according to user needs, and the disclosure is not limited thereto.

According to this embodiment, the processor circuit 114 may include a touch controller 141, a display controller 143, a system controller 145, and a processor 147. The touch controller 141 is configured to control a touch operation of the second display region 124. The display controller 143 can be configured to control a display operation of the display device 112. In addition, the processor circuit 114 may also include a first port 142 and a second port 144. The first port 142 may receive the data signal S1 from the head unit 121, the electronic control unit (ECU), etc. through an automotive bus 210. The automotive bus 210 is, for example, Controller Area Network (CAN), Local Interconnect Network (LIN), etc. The disclosure does not limit the type of automotive bus. The processor 147 receives the data signal S1 through the first port 142 and outputs the data signal S1 to the system controller 145. The data signal S1 may include data to be displayed on dashboard. The system controller 145 generates a first image signal S3 according to the data signal S1 to display image information included in the first image signal S3 in the first display region 122.

On the other hand, the second port 144 through automotive Ethernet may receive the second image signal S2 from the head unit 121, rear seat entertainment (RSE) and other devices. This disclosure is not limited to receiving signals from the head unit and the rear seat entertainment system. The system controller 145 receives the second image signal S2 through the second port 144 and displays image information included in the second image signal S2 in the second display region 124. According to this embodiment, the second image signal S2 can be a compressed image signal whose image signal compression specification is, for example, advanced video coding H.264 or high efficiency video coding H.265, and the disclosure does not limit the image signal compression specification. In addition, according to this embodiment, a transmission path for transmitting the second image signal S2 between the system controller 145 and the second port 144 and a transmission path for transmitting the second image signal S2 between the head unit 121 and the second port 144 may not include a SERializer/DESerializer (SerDes). That is, the second image signal S2 may not be provided through a SERializer/DESerializer. In some embodiments, the second image signal S2 may not be a compressed image signal, but not limited thereto.

According to this embodiment, a portion 124_3 of the data signal S1 may also be displayed in the first display region 122. For example, when a car is linked to a mobile communication device and the mobile communication device receives an incoming call, the data signal S1 may include caller ID, so the caller ID information of the data signal S1 may also be displayed in the first display region 122 to remind a driver that the mobile communication device is receiving an incoming call at this time.

Therefore, according to this embodiment, the display system 110 generates image content to be displayed on the cluster display by itself through the processor circuit 114, so that the head unit 121 may not have to transmit an image signal corresponding to the image content of the cluster display, thereby reducing bandwidth requirement on a signal transmission path. On the other hand, the head unit 121 transmits image content to be displayed on the central information display to the processor circuit 114 by streaming through the automotive Ethernet, which in turn reduces bandwidth requirement on a signal transmission path, thereby reducing overall complexity of the cockpit system 100. According to another embodiment, the automotive Ethernet may include Audio Video Bridging (AVB), Time-Sensitive Networking (TSN), but not limited thereto.

According to this embodiment, the display device 112 may include a liquid crystal display device, a self-luminous display device such as an organic light emitting diode (OLED) display device, a sub-millimeter light emitting diode (mini LED) display device, a micro light emitting diode (micro LED) display device, or quantum dot light emitting diode (quantum dot, QD, may be, for example, QLED, QDLED) display device, fluorescent, phosphor or other suitable materials and the materials may be arranged in any combination, but not limited thereto. This disclosure does not limit the type of the display device.

According to this embodiment, the controller or the processor of the processor circuit 114 may be a circuit component with computing capability. Alternatively, the controller or the processor included in the processor circuit 114 may be designed by means of hardware description languages (HDL) or any other design method familiar to those skilled in the art for digital circuits, and may be a hardware circuit implemented by a field programmable logic gate array (FPGA), a complex programmable logic device (CPLD), or an application-specific integrated circuit (ASIC), but not limited thereto.

Figure 3:
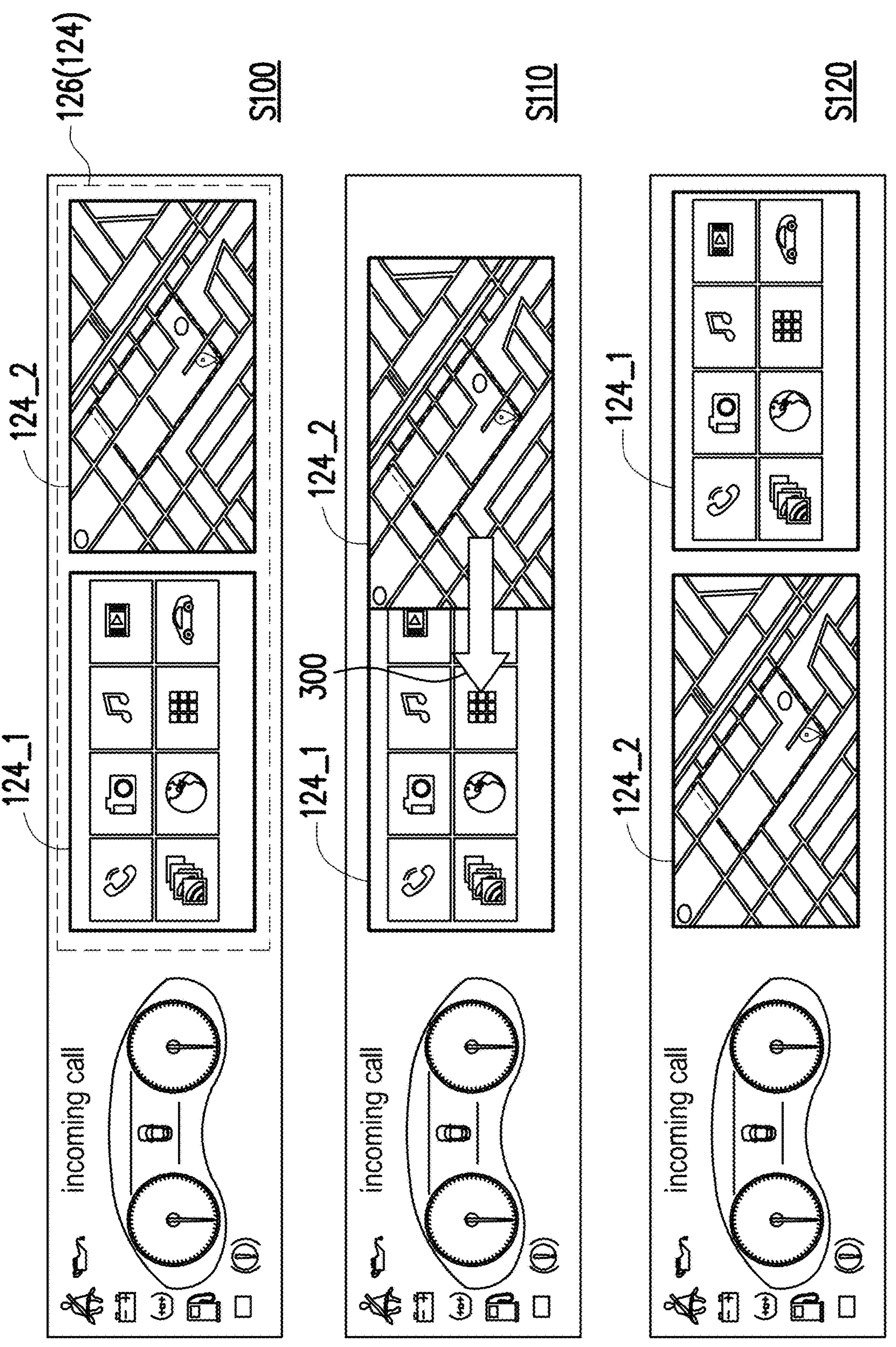
FIG. 3 shows a schematic diagram according to some embodiments of the disclosure performing touch operations on a display system.

FIG. 3 shows a schematic diagram according to some embodiments of the disclosure performing touch operations on a display system. Referring to FIG. 2 and FIG. 3, the disclosure is illustrated with the second display region 124 having a touch function as an example. According to some embodiments, the first display region 122 may have a touch function, or both the first display region 122 and the second display region 124 have the touch function, which may be designed according to user needs, and the disclosure is not limited thereto. The second display region 124 may include a touch region 126. The images displayed in the second display region 124 may include a first image 124_1 and a second image 124_2. The touch controller 141 executes a touch operation in the touch region 126 according to a touch instruction to adjust display positions of the first image 124_1 and the second image 124_2 in the second display region 124. Specifically, according to Step S100, the second display region 124 displays the first image 124_1 and the second image 124_2, where the first image 124_1 is to the left of the second image 124_2. Next, according to Step S110, the touch region 126 senses a touch instruction 300 of user. According to this embodiment, the touch instruction 300 may include, for example, a swipe gesture to move the second image 124_2 to the left. The touch controller 141 executes a touch operation in the touch region 126 according to the touch instruction 300 to move the second image 124_2 to the left of the first image 124_1. According to Step S120, the second display region 124 displays the first image 124_1 and the second image 124_2, where the first image 124_1 is to the right of the second image 124_2. Therefore, user may adjust the positions of the displayed images in the second display region 124 through the touch instruction 300. According to this embodiment, a swipe gesture that moves the first image 124_1_right may also move the first image 124_1 to the right of the second image 124_2. According to this embodiment, the positions of the displayed images in the first image 124_1 and the second image 124_2 may be adjusted according to user needs.

In summary, according to the embodiments of the disclosure, the electronic device as the display system generates the image content to be displayed in the first display region by itself through the processor circuit, so that the head unit may not have to transmit the image signal corresponding to the image content in the first display region, thereby reducing bandwidth requirement on a signal transmission path. On the other hand, the head unit transmits image content to be displayed in the second display region to the processor circuit by streaming through the automotive Ethernet, which can reduce the bandwidth requirement on a signal transmission path and thus reduces the overall complexity of the cockpit system. In addition, the image content of the second display region may also be adjusted by the touch operation.

Finally, it should be noted that the above embodiments are intended only to illustrate the technical solutions of the disclosure and not to limit them. Although the disclosure is described in detail with reference to the foregoing embodiments, it will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An electronic device comprising:

a display device comprising a first display region and a second display region which is different from the first display region; and a processor circuit comprising a first port and a second port, wherein the first port and the second port are located in the same processor circuit, the first port receives a data signal, the processor circuit generates a first image signal according to the data signal by itself, and outputs the first image signal to drive the display device to display the first image signal in the first display region, and the second port receives a second image signal, and the processor circuit drives the display device to display the second image signal in the second display region, wherein the second display region comprises a touch region, and the processor circuit executes a touch operation of the touch region according to a touch instruction, and wherein images displayed in the second display region comprises a first image and a second image, and the processor circuit executes the touch operation of the touch region according to the touch instruction to adjust display positions of the first image and the second image in the second display region while the first display region maintain unchanged, wherein the data signal comprises dashboard information of an electronic control unit and a notice information signal from a mobile communication device, and the notice information of the data signal is displayed in the first display region simultaneously with the dashboard information.

2. The electronic device according to claim 1, wherein the second port receives the second image signal through automotive Ethernet.

3. The electronic device according to claim 2, wherein the second image signal is a compressed image signal.

4. The electronic device according to claim 3, wherein an image signal compression specification of the second image signal is video coding H.264.

5. The electronic device according to claim 3, wherein an image signal compression specification of the second image signal is video coding H.265.

6. The electronic device according to claim 1, wherein the first port receives the data signal through an automotive bus.

7. The electronic device according to claim 1, wherein the second image signal is not provided through a SERializer/DESerializer.

8. A processor circuit comprising a first port and a second port, wherein the first port and the second port are located in the same processor circuit, the first port receives a data signal, the processor circuit generates a first image signal according to the data signal by itself, and outputs the first image signal to drive the display device to display the first image signal in a first display region, and the second port receives a second image signal, and the processor circuit drives the display device to display the second image signal in a second display region which is different from the first display region, wherein the second display region comprises a touch region, and the processor circuit executes a touch operation of the touch region according to a touch instruction, and wherein images displayed in the second display region comprises a first image and a second image, and the processor circuit executes the touch operation of the touch region according to the touch instruction to adjust display positions of the first image and the second image in the second display region while the first display region maintain unchanged, wherein the data signal comprises dashboard information of an electronic control unit and a notice information signal from a mobile communication device, and the notice information of the data signal is displayed in the first display region simultaneously with the dashboard information.

9. The processor circuit according to claim 8, wherein the second port receives the second image signal through automotive Ethernet.

10. The processor circuit according to claim 9, wherein the second image signal is a compressed image signal.

11. The processor circuit according to claim 10, wherein an image signal compression specification of the second image signal is video coding H.264.

12. The processor circuit according to claim 10, wherein an image signal compression specification of the second image signal is video coding H.265.

13. The processor circuit according to claim 8, wherein the first port receives the data signal through an automotive bus.

14. The processor circuit according to claim 8, wherein the second image signal is not provided through a SERializer/DESerializer.

* * * * *